UNITED STATES PATENT OFFICE.

GEORGE PRESCOTT FULLER, OF NIAGARA FALLS, NEW YORK, ASSIGNOR TO NATIONAL ELECTROLYTIC COMPANY, OF NIAGARA FALLS, NEW YORK, A CORPORATION OF NEW YORK.

MAKING ARSENIC ACID AND ARSENICAL COMPOUNDS.

1,125,086.  Specification of Letters Patent. Patented Jan. 19, 1915.

No Drawing.   Application filed June 1, 1914.  Serial No. 842,024.

*To all whom it may concern:*

Be it known that I, GEORGE PRESCOTT FULLER, a citizen of the United States, residing at Niagara Falls, county of Niagara, and State of New York, have invented certain new and useful Improvements in Making Arsenic Acid and Arsenical Compounds, fully described and represented in the following specification.

This invention relates to the art of making arsenic acid and arsenical compounds.

The object of the invention is to produce arsenic acid and arsenates in a simple and economical manner.

With this general object in view, the invention broadly considered consists in electrolyzing an aqueous solution of an alkali metal halid containing arsenious oxid in suspension, whereby arsenic acid is produced, and then removing this arsenic acid from the solution, either as free arsenic acid or as an arsenate or other arsenical compound.

As a result of experiments, I have found that if arsenic trioxid ($As_4O_6$) be suspended in an aqueous solution of an alkali metal halid and the solution then subjected to electrolysis, arsenic acid will be found among the reaction products. I have also found that no undesirable secondary reactions occur in the process, such, for example, as would result in the deposition of arsenic on the cathode, or the generation of arsin, by cathodic reduction. Therefore, the electrolytic cell may conveniently be of the single compartment type as well as of the double compartment type, but, owing to the absence of undesirable secondary reactions, as above pointed out, there is no advantage in the use of the more complicated form of cell in which a diaphragm is used. Furthermore, I have found it advantageous, though not necessary, to add to the electrolyte a suitable amount of a chromate or other analogous substance which will prevent any cathodic reaction of hypochlorite. The anode must be insoluble and, for this purpose, I preferably employ platinum. The cathode is best made of copper, although a cathode of other metals may be employed, as will be obvious to those skilled in the art.

As sodium arsenate is the usual salt of arsenic acid employed in the arts, the arsenic acid produced by the above process may be treated in solution to convert it into such sodium arsenate, and then the latter removed. In carrying out this process, it is of great advantage to use an electrolyte consisting of an aqueous solution of a sodium halid, because the final removal of the arsenic acid as sodium arsenate is rendered less difficult than if arsenates of two different alkali metals were present.

On account of its cheapness, convenience, ready solubility, and other properties, I have found that sodium chlorid is a particularly suitable alkali metal halid from which to prepare an aqueous solution to serve as the electrolyte. In making such an electrolyte, I find it best to employ the sodium chlorid in concentrations of about 100 to 300 grams per liter. Furthermore, the electrolysis is most advantageously conducted at somewhat elevated temperatures, 40° to 70° C. being found most favorable.

The arsenic trioxid $As_4O_6$ used for carrying out my process is maintained in suspension in the electrolyte by suitable agitation of the bath. The electrolyte containing the arsenious oxid in suspension may be run through the cell continuously, the unoxidized excess filtered out and the solution concentrated, or the operation may be intermittent, solid oxid being added continuously to the electrolyte in the cell, and kept in suspension by suitable stirring, or other agitation of the bath, until any predetermined concentration of arsenic acid has been reached. This may vary according to the conditions of operation, the scale on which the process is being worked and the cost of electricity and evaporation. Under ordinary conditions, a concentration of from 25% to 40% would be satisfactory, although it is to be understood that my invention is not limited to this range of concentration. When the desired concentration is reached, the liquid is withdrawn from the cell and the latter is recharged with fresh electrolyte.

In practice, I find it best to discontinue the electrolysis before all of the arsenic trioxid has been oxdized, and then remove the excess by filtration. This excess may be used in a succeeding operation. When the electrolyte is an aqueous solution of sodium chlorid, the filtered liquid product of the electrolysis contains sodium chlorid and arsenic acid with slight amounts of sodium arsenate and hydrochloric acid. The arsenic acid may be recovered in the free state by evaporation of the liquid until the sodium chlorid separates out, whereupon the latter may be removed by filtering or most advantageously by centrifuging the liquid while hot. The sodium chlorid may be used in subsequent operations. After the removal of the sodium chlorid the solution may be allowed to cool, whereupon the arsenic acid will separate out if the solution was sufficiently concentrated during the evaporation. The solution is again filtered to remove the arsenic acid, and the filtrate may be employed again in subsequent operations, if desired.

When the process is being worked for the production of suitable salts of arsenic acid, the filtered liquid product of electrolysis may be treated chemically to convert the arsenic acid into the desired salt, and the latter then removed by suitable operations. I have found it particularly advantageous to convert the arsenic acid into sodium arsenate and then remove the latter from the solution. This may be done by reacting upon the filtered liquid product of electrolysis with sodium hydroxid, but I have found sodium carbonate to be most advantageous, because the salt thus obtained is the disodium arsenate, $Na_2HAsO_4$, which is the salt most used in the arts. When sodium hydroxid is employed, some trisodium arsenate, $Na_3AsO_4$, will be obtained, unless the arsenic acid is in excess.

As one explanation of the results obtained by my improved process, the following is submitted as a statement of the reactions which probably take place when arsenic trioxid is subjected to electrolysis in an aqueous solution of sodium chlorid: The primary reaction will be the formation of sodium hypochlorite. The solution being in contact with solid arsenious oxid, the latter will be dissolved until the solution is saturated with respect to arsenious oxid and at this time contains about 3.5% of the latter. Thereafter, by a secondary and purely chemical reaction, the hypochlorite will be reduced by the arsenious oxid regenerating sodium chlorid and oxidizing to arsenic pentoxid. As rapidly as this reaction occurs, further solid arsenious oxid will be dissolved in order to maintain the saturation of the solution with respect to such arsenious oxid. In this way, the concentration of the solution will be kept constant by the progressive solution of the solid arsenious oxid in proportion to the amount oxidized. The arsenic pentoxid, as rapidly as formed, will hydrate to arsenic acid. The small amounts of sodium arsenate and hydrochloric acid found in the liquid product of electrolysis are probably the result of a double decomposition occurring between small amounts of arsenic acid and sodium chlorid.

As a specific example of one way in which the process may be employed, the following is submitted: An aqueous solution containing 30% of sodium chlorid may be used as the electrolyte in a cell provided with a copper cathode and a platinum anode. The electrolyte may be kept at a temperature of 56° C. and subjected to an E. M. F. of 3.1 volts. The arsenious oxid may be introduced in intermittent charges with suitable agitation to maintain it in suspension in the electrolyte. I have found that in carrying out this specific process and then removing the arsenic acid as an arsenate, 50 grams of arsenic trioxid being charged at the commencement and thereafter 25 grams at 10 minute intervals until 1500 grams in all had been added, there were obtained 2790 grams of disodium arsenate. A current efficiency of 96% was obtained.

What is claimed is:—

1. The process which comprises electrolyzing a solution of an alkali metal halid in the presence of arsenious oxid.

2. The process which comprises suspending arsenious oxid in an aqueous solution of a halid of an alkali metal and subjecting to electrolysis.

3. The process which comprises suspending arsenious oxid in an aqueous solution of sodium chlorid and subjecting to electrolysis.

4. The process which comprises suspending arsenious oxid in an aqueous solution of an alkali metal halid and subjecting to electrolysis, filtering the reaction product and treating the filtrate to recover the arsenical compounds therein.

5. The process of making arsenates, which comprises suspending arsenious oxid in an aqueous solution of an alkali metal halid, subjecting to electrolysis, filtering the solution, neutralizing the filtrate to produce an arsenate and recovering the arsenate.

6. The process of making arsenates, which comprises suspending arsenious oxid in an aqueous solution of an alkali metal halid, subjecting to electrolysis, filtering the solution, reacting on the filtrate with an alkali metal compound, and then recovering the arsenate of the alkali metal.

7. The process of making arsenates, which comprises maintaining arsenious oxid in suspension in an aqueous solution of sodium chlorid while subjecting the solution to electrolysis, filtering the solution, treating the filtrate with an alkali metal carbonate to form an arsenate, and then recovering the arsenate of the alkali metal.

8. The process of making arsenates, which comprises maintaining arsenic trioxid in suspension in an aqueous solution of sodium chlorid while subjecting the solution to the action of an electrolyzing current to produce arsenic acid, filtering the solution to remove unconverted arsenic trioxid, treating the filtrate with sodium carbonate to convert the arsenic acid to disodium arsenate and separating out the latter.

9. The process which comprises electrolyzing a solution of an alkali metal halid in the presence of arsenious oxid and material capable of preventing cathodic reaction of hypochlorite.

10. The process which comprises electrolyzing a solution of an alkali metal in the presence of arsenious oxid and a chromate which will prevent cathodic reaction of hypochlorite.

In testimony whereof, I have hereunto set my hand, in the presence of two subscribing witnesses.

GEORGE PRESCOTT FULLER.

Witnesses:
H. G. LAUBOCKER,
V. J. STAFFORD.